United States Patent [19]

Vaginay

[11] 4,035,341
[45] July 12, 1977

[54] POLYESTER COMPOSITIONS WITH GOOD DYEING AFFINITY AND A PROCESS FOR OBTAINING SAME

[75] Inventor: Yves Vaginay, Lyon, France

[73] Assignee: Rhone-Poulenc-Textile, Paris, France

[21] Appl. No.: 555,342

[22] Filed: Mar. 5, 1975

Related U.S. Application Data

[63] Continuation-in-part of Ser. No. 499,919, Aug. 23, 1974, abandoned, which is a continuation of Ser. No. 301,994, Oct. 30, 1972, abandoned.

[30] Foreign Application Priority Data

Oct. 29, 1971 France .............................. 71.39877

[51] Int. Cl.² .......................................... C08K 5/19
[52] U.S. Cl. ............................................. 260/75 N
[58] Field of Search .................................. 260/75 N

[56] References Cited

U.S. PATENT DOCUMENTS

| | | | |
|---|---|---|---|
| 3,039,998 | 6/1962 | Boerma | 260/75 N |
| 3,325,454 | 6/1967 | Nakamura | 260/75 N |
| 3,388,104 | 6/1968 | Crovatt | 260/78 S |
| 3,454,625 | 7/1969 | Eiseman | 260/75 N |
| 3,655,821 | 4/1972 | Lofquist | 260/DIG. 17 |

OTHER PUBLICATIONS

Chemical Abstracts, vol. 70, 1969, No. 107450u.

*Primary Examiner*—Paul R. Michl
*Attorney, Agent, or Firm*—Stevens, Davis, Miller & Mosher

[57] ABSTRACT

Compositions of polyesters having improved affinity for acid dyes are produced by incorporating in the compositions of polyester-forming dicarboxylic acid and dihydric alcohols quaternary ammonium compounds of the formula

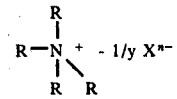

wherein the R's represent aliphatic, cycloaliphatic or aromatic radicals, said R's being free of ester-forming substituents, at least two R's being capable of forming together a ring containing or not other quaternizable nitrogen atoms; and where:

$X^{n-}$ is a stable anion of valency $n$ of an organic acid, of a mineral oxyacid, or an halide; and where:

$y$ is an integer equal to the valence of the anion.

12 Claims, No Drawings

POLYESTER COMPOSITIONS WITH GOOD DYEING AFFINITY AND A PROCESS FOR OBTAINING SAME

This application is a continuation-in-part of copending application Ser. No. 499,919, filed Aug. 23, 1974, now abandoned, which is a continuation of application Ser. No. 301,994, filed Oct. 30, 1972, now abandoned.

This invention relates to new polyester-based polymer compositions possessing good dyeing affinity for acid dyes. The invention also applies to a process for producing these fiber-forming polyester compositions.

Polyesters derived from aromatic dicarboxylic acids, and in particular from terephthalic acid and from aliphatic or cycloaliphatci dihydric alcohols have become of great commercial applicability in many uses because of their great toughness, their elasticity, their wrinkle-resistance, etc. However, the threads and fibers obtained from these polyesters are difficult to dye because of the lack of reactive sites in or on the macromolecular chains.

Acid dyes are a category that holds particular interest in view of their light-fastness and also because of their low cost. Unfortunately, in contrast to the polyamides, for instance, polyesters provide no affinity whatever for these kinds of dyes.

U.S. Pat. No. 2,891,929 has proposed introducing aminated groupings into the polyester by replacing part of the diacid by an aminated one during condensation of the diacid with dihydric alcohol. But the polymers so obtained are subject to a pronounced tendency to yellow during the heat treatments they undergo during processing.

It has also been proposed in British Pat. No. 1,023,707 that during the interchange of raw materials or during the polycondensation leading to polyester formation 0.0005 to 1 mol% of a quaternary ammonium halide be mixed with the reagents. The polyesters so obtained provide a good softening point, but they do not offer any significant or particular dyeing affinity.

In U.S. Pat. No. 3,325,454 a process has been proposed for preparing polyethylene terephthalate by directly esterifying terephthalic acid with ethylene glycol followed by the polycondensation of the resulting product, whereby the formation of ether bonds is prevented and a polymer of high softening point is obtained by adding prior to completion of said esterification reaction, 0.0005 to 1.0 mol percent of a quaternary ammonium compound.

However, when such a quaternary ammonium compound is added during esterification, it is decomposed into amines so that the carboxylic groups are neutralized thus preventing the formation of ether bonds. The polyester contains none of the quaternary ammonium compound.

In U.S. Pat. No. 3,039,998 a process has also been proposed to prepare polyethylene terephthalate with a greater resistance to thermal degradation in which at least the ester interchange is carried out in the presence, as catalysts, of organic bases or their salts such as quaternary ammonium compounds, in an amount less than 1% by weight of dimethyl terephthalate.

As in U.S. Pat. No. 3,325,454, such compounds are decomposed into amines and are not contained in the resulting polymer.

In copending application S.N. 225,201 filed May 22, 1972, there are described novel fiber-forming polyesters derived from at least one aromatic dicarboxylic acid and a dihydric alcohol as well as methods of preparing same, said polyester containing with respect to the total of the recurring units of the polyesters, 0.1 – 10 mol % of units issuing from a product having the formula

wherein the R's are aliphatic, aromatic or cycloaliphatic radicals, at least one R being substituted by at least a group capable of forming ester bonds with the recurring polyester units. Two or three of the R's may form a ring which may contain other quaternizable nitrogen atoms. Any two R's may be identical, and in fact, the four R's may comprise two pairs wherein an R of each pair is identical to the other R of that pair. In the above formula, $X^{n-}$ represents a stable anion of valence n of an organic acid or a mineral oxyacid and y is an integer equal the valence of the anion.

In accordance with the above identified earlier application, the recurrent units issuing from the product of the formula (I) form part of the chain of the polymer as this product bears groups capable of forming ester bonds, e.g. OH groups.

There have now been found new compositions having a base of polyesters derived from at least one aromatic dicarboxylic acid or derivative thereof and at least one aliphatic or cycloaliphatic diol which composition containing 1 – 10 mol % with respect to the total of the recurring units of the polyester or polyesters, of an added compound of the formula

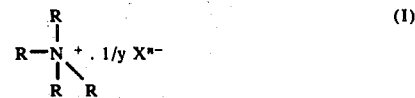

wherein the R's represent aliphatic, cycloaliphatic or aromatic radicals, said R's being free of ester-forming substituents, at least two R's being capable of forming together a ring containing or not other quaternizable nitrogen atoms; and where:

$X^{n-}$ is a stable anion of valency n of an organic acid, of a mineral oxyacid or an halide; and where:

y is an integer equal to the valence of the anion.

Any 2 R's may be identical and, in fact, the 4 R's may comprise two pairs wherein an R of each pair is identical to the other R of that pair. The R's are free of ester-forming substituents.

The present invention also relates to a process for producing the above described polyester compositions by polycondensing, in the presence of 1 – 10 mol % with respect to the number of mols of the dicarboxylic acid or its derivative, of a product of formula (I), such product being added after the end of interchange, of at least one aromatic dicarboxylic acid with aliphatic or cycloaliphatic dihydric alcohols, or after the end of the esterifying step of at least one aromatic dicarboxylic acid with aliphatic or cycloaliphatic dihydric alcohols. If desired, a small quantity of aliphatic dicarboxylic acid and/or a polyethylene glycol may be added to the reaction mixture in order to modify slightly the properties of the polyester produced, for example for 0 to 10 mol%.

Finally, a polyester composition containing the compound of the formula (I) may be mixed with another polyester. The product (I) would also be added just before spinning. It is preferably added at the end of polycondensation.

The aromatic dicarboxylic acids which are used in the formation of the instant polyesters are generally well known and preferably containing from about 8 to about 14 carbon atoms. The dicarboxylic acids or esters thereof may be represented by the formula $R_1OOC-R_2-X-R_3-COOR_4$ wherein $R_1$ and $R_4$ each represent hydrogen or an alkyl radical containing from 1 to 10 carbon atoms and $R_2$ and $R_3$ each represent $(CH_2)_{m-1}$, wherein m is an integer of from 1-5 inclusive, and X represents a divalent aromatic radical of the formula

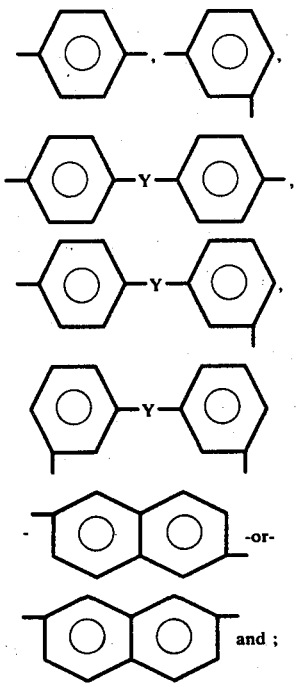

Y represents a radical of the formula

$-(CH_2)_{m-1}-; -O-$ or $-SO_2-$

Though terephthalic acid and its alkyl esters are preferred, any of the other above acids or esters of such acids can be employed with good results.

As indicated above, small quantities of an aliphatic dicarboxylic acid and/or of a polyethylene glycol may be included in the reaction mixture to modify the properties of the polyester. The aliphatic dicarboxylic acids or esters thereof are represented by the formula $R_1OOC-R_2-COOR_3$ wherein $R_1$ and $R_3$ are either hydrogen or alkyl radicals containing from 1 to 10 carbon atoms, and $R_2$ is an aliphatic hydrocarbon radical. Thus, typical aliphatic dibasic dicarboxylic acids which can be employed include oxalic acid, succinic acid, adipic acid, sebacic acid, α, α-dimethyl glutaric acid, dimethyl malonic acid, diglycollic acid, β-oxydipropionic acid, γ oxydibutyric acid, maleic acid, fumaric acid, itaconic acid, and similar well known aliphatic dibasic acids. The acids of this type which are preferred are those containing at least 6 carbon atoms. The esters of such acids can also be used, and the alkyl esters wherein each alkyl group contains from 1 to 10 carbon atoms are desirably employed.

In general, the preferred aliphatic dicarboxylic acid contains from about 6 to 12 carbon atoms.

The dihydric alcohols or esters thereof which may be employed in forming the instant polyesters may be aliphatic or cycloaliphatic. The aliphatic alcohols may be represented by the formula $R_5O-(CH_2)_p-OR_6$ wherein p is an integer of from 2 to 12 inclusive, and $R_5$ and $R_6$ each represents either a hydrogen atom, or an acyl radical containing from 2 to 4 carbon atoms. The polyhydric alcohols which are preferably employed in practicing the invention are the glycols which are commonly used in the preparation of polyesters such as ethylene glycol, trimethylene glycol, tetramethylene glycol, pentamethylene glycol, hexamethylene glycol, heptamethylene glycol, octamethylene glycol, and similar well known polymethylene glycols.

Cycloaliphatic alcohols may be represented, for example by the formula

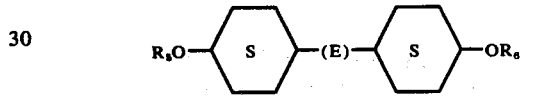

wherein $R_5$ and $R_6$ are as previously described and E is branched or straight chain alkyl group having 1 to 5 carbon atoms. One such dihydric alcohol which is preferred is bis (4-hydroxycyclohexyl)2-2 propane. The cycloaliphatic alcohols may also be represented by the formula

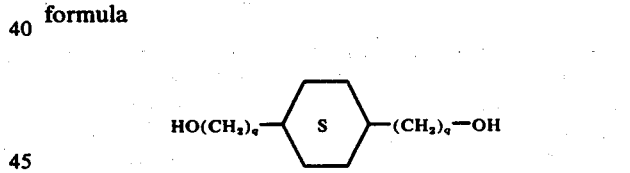

wherein q is an integer of 1-5. A preferred example of such alcohols is cyclohexane dimethane diol.

The formation of the polyesters is, per se, a well-known procedure and as previously indicated, is described in Pat. No. 2,891,929. The proportions of dicarboxylic acid and dihydric alcohol may be varied over a fairly wide range, but in general, the dihydric alcohol is used in excess amounts of up to about 5 times.

In the above formula (I), R may be an aliphatic group having 1 to 12 carbon atoms or an aromatic radical represented by the formula

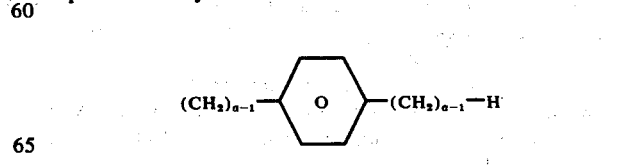

wherein a is an integer from 1-12. R may also be a cycloaliphatic radical represented by the formula

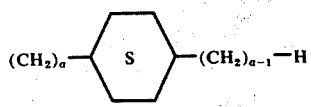

wherein a has the same meaning as above. Two or three R radicals may together form a cycle which may contain nitrogen atoms that can be rendered quaternary as is stated above. Representative of such cyclic formation are the following wherein a has the same significance as above.

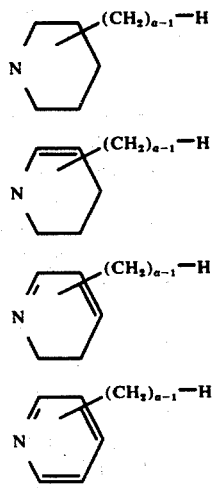

In general, the R radicals may possess from about 1 to about 30 carbon atoms.

In the above formula (I), the anion may be, for example, sulfate, sulfonate, phosphonate or chloride.

Illustrative examples of such compounds are, for example, the para-toluene sulfonates of methyl trioctyl ammonium, tetrabenzyl ammonium, N,N'-dimethyl-NN'-dibenzyl piperazinium, and the bis-para-toluene sulfonate of N,N,N',N'-tetramethyl N,N'-distearyl hexamethylene diammonium or N,N,N,N',N',N'-hexamethyldodecamethylene diammonium, dimethyl stearyl benzyl ammonium chloride, dimethyl palmityl benzyl ammonium chloride, or trioctyl benzyl ammonium chloride.

The instant polyester compositions have good dye affinity, for simple and metalliferous acid dyestuffs, and are particularly suitable in the production of yarns and fibers.

It is generally preferred to use compositions containing 1 to 3% of the product of formula (I) for reasons of effectiveness and economy.

Although the dyestuff is not believed bound chemically to the dyed fiber, the textile articles obtained from the compositions in accordance with the invention have as in said earlier application, excellent fastness to light as well as to washing, dry-cleaning and sublimation.

The following examples, in which the percentages are by weight, are given by way of illustration and not of limitation in order to explain the invention.

In the following example, the dyestuffs are indicated by their CI reference coming from "Colour Index", 1956 edition and its supplements.

EXAMPLE 1

Tetrabenzyl ammonium para-toluene sulfonate is prepared from benzyl para-toluene sulfonate and tribenzylamine.

There are charged simultaneously, with agitation, into a stainless steel reactor.

| terephthalic acid | 3,320 parts |
|---|---|
| hexanediol-1,6 | 2,838 parts |

The mixture is gradually heated for 2½ hours to a temperature of 260° C. Thereupon 5 parts of butyl orthotitanate are added and the pressure is gradually lowered to 1mm mercury within 50 minutes; the polycondensation is carried out 1 ¼ hour at 265° C. under a pressure of 1mm Hg.

The vacuum is then broken with nitrogen and 220 parts of tetrabenzyl ammonium para-toluene sulfonate are added and agitated with the reaction mass for 15 minutes under vacuum.

There is obtained a homogeneous, slightly opalescent product which is cast and granulated.

Its 1% specific viscosity in ortho-chlorophenol is 1.10 and its softening point 156° C.

After drying for 2 hours at 140° C., the molten granulates are extruded through a spinneret of 23 orifices of a diameter of 0.23 mm and then drawn on pin and plate under the following conditions:

| Temperature of the pin | 70° C. |
|---|---|
| Temperature of the plate | 100° C. |
| Draw ratio | 3 X |

The thread obtained has the following properties:

| Count | 32 dtex/23 ends |
|---|---|
| Tenacity | 3.12 g/tex |
| Elongation | 12 % |

A hank of 20 g. of this thread is placed in a bath of the following composition:

| CI Acid Blue 120 | 0.4 g |
|---|---|
| Diammonium phosphate | 1 g |
| Condensate of stearyl- and oleylamine on ethylene oxide | 0.5 g |
| Water | q.s. for 1,000 ml |
| Acetic acid | q.s. for pH 3-4 |

After boiling for 30 minutes at 98° C., the bath is exhausted. The blue thread obtained is washed with water at 60° C. containing 1.5% of an alkyl sulfate and then rinsed and dried.

The thread is of a blue color an its color does not disappear upon extraction for 20 minutes in water and methylene chloride.

As control, a hexamethylene glycol polyterephthalate, prepared without addition of tetrabenzyl ammonium para-toluene sulfonate, obtained and treated in an identical manner, assumes only a very light blue color which disappears completely after washing and extraction under the same conditions.

EXAMPLE 2 a. Into a reactor there are introduced with agitation 190.5 parts of para-toluene sulfochloride, 59 parts of hexanediol-1,6 and 400 parts of dioxan.

60 parts of powdered potassium hydroxide are gradually added while maintaining the temperature below 10° C. and the pH of the total mixture at less than or equal to 6. Thereupon 300 parts of ice are added.

After settling, the organic phase is washed with ice water and then dried, obtaining a pasty solid (product A) which is recrystallized twice from methanol.

158 parts of product A are suspended in 378 parts of butanediol-1,4 in a reactor with agitation into which there are gradually introduced 220 parts of N,N-dimethyl stearylamine which has been previously prepared (product B) and the entire mixture is brought for 10 minutes to 100° C.

The heating is stopped and the mass diluted with twice its volume of acetone and vigorously cooled; after precipitation, filtration, washing with 200 parts of acetone and drying, there are obtained 314 parts of N,N,N',N'-tetramethyl-N,N'-distearylhexamethylene diammonium bis-para-toluene sulfonate (product C).

b. There are simultaneously introduced into a stainless steel reactor with agitation:

| dimethyl terephthalate | 3,880 parts |
|---|---|
| butanediol-1,4 | 2,250 parts |
| triethanolamine titanate | 0.9 parts |

At about 160° C., the interchange of the alcohols commences and the methanol formed is distilled over. When the temperature reaches 250° C., 88 parts of a 20% suspension of titanium oxide in butanediol are added, whereupon the pressure is gradually decreased to 1 mm Hg in 40 minutes, the temperature of the mass reaching 260° C.

After 45 minutes of polycondensation, 408 parts of product C are added and the polycondensation is continued for 10 minutes.

There is obtained a white polymer of a viscosity index of 106, of melt viscosity at 260° C. of 1900 poises, and a softening point of 223.2° C.

After drying for 2 hours at 140° C., the granules of polymers are extruded through a spinneret having 23 apertures of 0.34-mm diameter, then drawn on pin and plate under the following conditions:

| temperature of pin | 80° C. |
|---|---|
| temperature of plate | 120° C. |
| draw ratio | 4.5 X |

The yarn obtained has the following properties:
| tenacity | 2.96 g/tex |
|---|---|
| elongation | 14% |

A hank of 2 g of this yarn is immersed in 100 ml. of a bath of the following composition:

| CI Acid Blue 40 | 0.4 g |
|---|---|
| diammonium phosphate | 1 g |
| condensate of stearyl- and oleylamine on ethylene oxide | 0.5 g |
| water | q.s. to 1000 ml |
| acetic acid | q.s. to a pH of 3–4 |
| trichlorobenzene | 10 g |

After 1 hour at 98° C., the dried yarn is of blue color and this color does not disappear upon washing at 60° C. with a 5% aqueous solution of an alkyl sulfate and repeated washings with acetone.

As control, a tetramethylene glycol polyterephthalate, prepared, extruded and dyed under the same conditions but without the addition of product C to the polycondensation, assumes only a slight coloration which disappears upon washing at 60° C. under the same conditions.

Example 3

(a) Into a reactor with agitation there are introduced

| dodecamethylene diamine | 600 parts |
|---|---|
| formic acid | 1380 parts |

The reaction medium being at about 60° C., there are gradually added 1320 g. of an aqueous solution of 30% formaldehyde. At the end of the addition the temperature rises to 102° C. The mass is then heated under reflux for 18 hours. After cooling, the medium is acidified by 650 g. of 38% hydrochloric acid and concentrated to one-quarter of its volume.

There are then added 530 parts of soda dissolved in 1250 parts of water while maintaining the temperature below 30° C. The organic phase is decanted, dried and distilled; a product D is obtained.

256 parts of product D are dissolved, with agitation, in a reactor in 628 parts butanediol-1,4 and 372 parts of methyl para-toluene sulfonate are gradually added. The temperature then rises spontaneously to about 80° C.

Heating is effected for 30 minutes at about 110°–120° C. to complete the reaction, the pH of the medium being then neutral.

After cooling, the mixture is diluted with 2 times its volume of acetone; there is obtained a precipitate (product E) which is N,N,N,N',N',N'-hexamethyl dodecamethylene diammonium bis-para-toluene sulfonate.

b. Into a stainless steel reactor there are introduced:

| dimethyl terephthalate | 3880 parts |
|---|---|
| butanediol-1,4 | 2250 parts |
| triethanolamine titanate | 0.9 part |

Heating is effected to 250° C. and 251 parts of finely crushed product E are added.

The pressure is gradually lowered to 1 mm Hg in 50 minutes, while the temperature reaches 260° C. The polycondensation continues for 45 minutes.

There is obtained a white polymer which has a viscosity index of 112, a melt viscosity at 260 C. of 2300 poises, and a softening point 224° C.

After drying for 2 hours at 140° C., the molten polymer is extruded through a spinneret having 23 orifices of 0.34-mm diameter. The filaments obtained are stretched in the following manner:

| temperature of pin | 80° C. |
|---|---|
| temperature of plate | 120° C. |
| draw ratio | 4.5 X |

They have the following properties:

| | |
|---|---|
| tenacity | 30.2 g/tex |
| elongation | 16% |

A hank of 2 g of this yarn is placed in 100 ml of a bath of the following compositions:

| | |
|---|---|
| Cl Acid Red 266 | 0.4 g |
| diammonium phosphate | 1 g |
| condensate of stearyl- and oleylamine on ethylene oxide | 0.5 g |
| water | q.s. to 1000 ml |
| acetic acid | q.s. to a pH of 3–4 |
| trichlorobenzene | 10 g |

After 1 hour at 98° C., the dried thread is colored red; this color does not disappear upon washing at 60° C. with a 5% aqueous solution of an alkyl sulfate and repeated washings with acetone.

As control, a tetramethylene glycol polytetrephthalate, prepared, extruded and dyed under the same conditions but without addition of the product E to the polycondensation, assumes only a slight color which disappears completey upon washing at 60° C.

In all the examples, the viscosity index IV is determined on the basis of the solution viscosity measured at 25° C. on 1% weight per volume of polymer in orthochlorophenol, and given by the formula:

$$IV = \frac{\text{Specific viscosity}}{\text{Concentration}} \times 1000$$

in which the concentration is expressed in g/1.

EXAMPLE 4

Into a stainless steel reagent container the following compounds are loaded simultaneously, under continuous stirring:

| | |
|---|---|
| Dimethyl terephthalate | 1,940 parts |
| Butane diol-1,4 | 1,125 parts |
| Triethanolamine polytitanate | 0.88 parts |

The alcohol interchange begins at about 164° C; after 85 minutes all the methanol produced has been distilled off, the reaction medium being at 232° C. At 240° C, 0.88 part of triethanolamine polytitanate are added. The pressure is reduced to 1 torr over a period of 30 minutes while the reaction medium reaches a temperature of 253° C.

The polycondensation step is undertaken at 253° C, under a vacuum of 0.4 torr, for an hour. The vacuum is broken with nitrogen and 96 parts (2 mols %) of trioctyl benzyl ammonium chloride are added to the reaction medium under stirring.

The polymer thus prepared contains 99% of the compound introduced.

The polymer is poured and granulated. Two grams of this powder are placed into a bath consisting of:

| | |
|---|---|
| Cl Acid Blue | 0.04 g |
| Diammonium phosphate | 0.1 g |
| Stearyl Amine and oleyl amine condensate on ethylene oxide | 0.05 g |
| Water enough for | 100 ml |
| Acetic acid enough for | pH 3–4 |

After 30 minutes of boiling at atmospheric pressure, the polymer has an intense blue coloration; such a coloration does not disappear after washing and extraction.

EXAMPLE 5 (comparative)

Example 4 of U.S. Pat. No. 3,325,454 is repeated exactly under the same conditions, with 0.5 mol % of tetrabutyl ammonium chloride. The polymer thus obtained has the following characteristics:

| | |
|---|---|
| Viscosity index | 880 |
| Melt viscosity at 290° C | 5,045 poises |
| Softening point | 255.1° C |

This polymer contains practically no nitrogen.

EXAMPLE 6 (comparative)

The Example 4 of U.S. Pat. No. 3,325,454 is repeated except that the proportion of tetrabutyl ammonium chloride is 1 mol %.

The polymer thus obtained has the following characteristics:

| | |
|---|---|
| Viscosity index | 900 |
| Melt viscosity at 290° C | 5,190 poises |
| Softening point | 254.5° C |

The polymer contains only 22.5% of the nitrogen as compared to the quantity introduced in the quaternary ammonium compound.

What is claimed is:

1. A melt spinnable composition consisting essentially of
    a polyester of at least one aromatic dicarboxylic acid or derivative thereof and at least one dihydric alcohol, and
    1–10% of units with respect to the sum of the recurring units of the polymer, of a compound of the formula:

wherein the R's represent alkyl cycloaliphatic, or aromatic radicals, said R's being free from ester forming substituents, at least two R's being capable of forming together a ring containing or not other quaternizable nitrogen atoms and where:
    $X^{n-}$ is a stable anion of valency n of an organic acid, a mineral oxyacid or is an halide, and
    Y is an integer equal to the valence of the anion.

2. A melt spinnable compositon according to claim 1 in which the polyester contains 1–10 mol 5 of units derived from an aliphatic dicarboxylic acid.

3. A melt spinnable composition according to claim 1 containing 1–3 mol % of said compound of formula (I).

4. A melt spinnable composition according to claim 1, wherein the aromatic dicarboxylic acid contains about 8 to about 14 carbon atoms and the dihydric alcohols are aliphatic or cycloaliphatic alcohols which contain 2-10 carbon atoms.

5. A melt spinnable composition according to claim 1, wherein in the compound of formula (I) R is an alkyl radical containing 1-12 carbon atoms.

6. A melt spinnable composition according to claim 1, wherein in the compound of formula (I) R is an aromatic radical of the formula

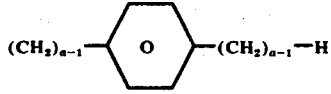

where $a$ is an integer of 1-12.

7. A melt spinnable composition according to claim 1, wherein in the compound of formula (I) R is a cycloaliphatic radical represented by the formula

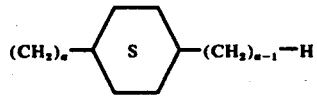

where $a$ is an integer from 1-12.

8. A melt spinnable composition according to claim 1, wherein at least two R's form rings of the formula

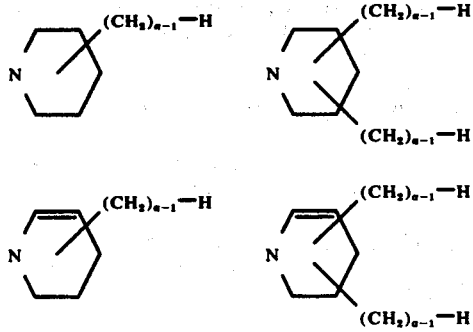

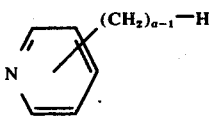
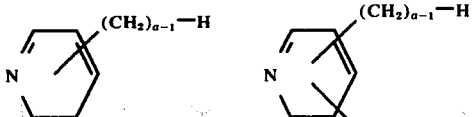
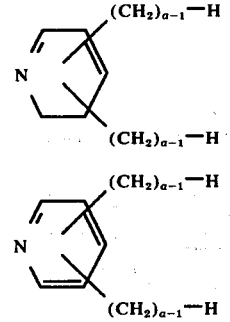
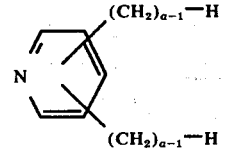

where $a$ is an integer from 1-12.

9. A process for producing a melt spinnable composition according to claim 1 comprising
    reacting at least an aromatic dicarboxylic acid or a derivtive thereof with at least one dihydric alcohol,
    then polycondensing the product thus obtained in the presence of 1-10% mols with respect to the number of mols of the dicarboxylic acid or derivative thereof, of the product of formula (I) as defined in claim 1.

10. A process for producing a melt spinnable composition according to claim 1 comprising:
    reacting at least an aromatic dicarboxylic acid or derivative thereof and an aliphatic dicarboxylic acid with at least one dihydric alcohol,
    then polycondensing the product thus obtained in the presence of 1-10 % mols with respect to the number of mols of the dicarboxylic acid or derivative thereof, of the product of formula (I) as defined in claim 1.

11. A process for producing a melt spinnable composition as defined in claim 1, comprising:
    reacting at least one aromatic dicarboxylic acid or derivative thereof with at least one dihydric alcohol in the presence of a product having the formula I as defined in claim 1; and
    mixing said polyester composition with a conventional polyester in such quantities that the concentration of said product is 1-10 mol % of the total recurring polyester units in the mixture.

12. Filaments consisting essentially of the composition of claim 1.

* * * * *